Dec. 16, 1941.    W. R. McDONALD    2,266,374
TEMPERATURE COMPENSATING SCALE
Filed April 10, 1939
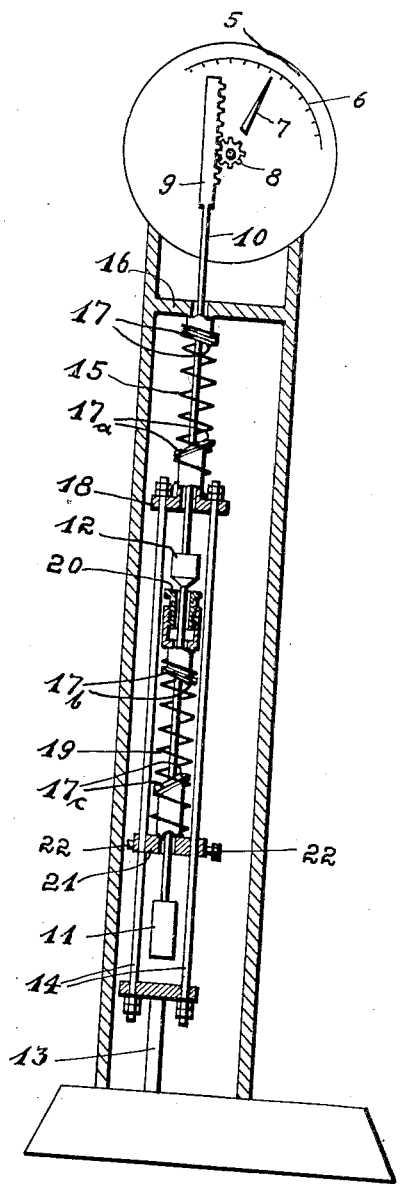
WILLIAM R. McDONALD,
INVENTOR.
BY Otto H. Kinger,
HIS ATTORNEY.

Patented Dec. 16, 1941

2,266,374

UNITED STATES PATENT OFFICE 2,266,374

TEMPERATURE COMPENSATING SCALE

William R. McDonald, Los Angeles, Calif.

Application April 10, 1939, Serial No. 267,054

6 Claims. (Cl. 265—69)

This invention relates to spring-actuated scales used for taking the weight of people.

One of the objects of this invention is to provide means by which to compensate any variations due to temperature influence upon metals or materials.

Another object is to provide temperature compensating means separate from the weight supporting parts.

Another object is to provide temperature compensating means in scales in which the weight-indicating parts are disconnected from and merely in a follow-up contact relation to the weight-supporting parts.

Another object is to provide temperature compensating means for scales of the last-named type in which an extension of springs connected to the weight supporting parts will be counteracted by a quite similar expansion to approach the following weight-indicating parts accordingly.

Other objects will appear from the following description and appended claims as well as from the accompanying drawing, in which the figure is a schematic and fragmentary illustration of a spring-actuated scale arranged to operate according to this invention.

Scales are generally provided with a head 5 enclosing a dial 6, to which an indicating hand 7 takes appropriate positions corresponding to the weight placed on the scales.

This invention is particularly referring to scales in which the indicating hand is carried by an independent mechanism that is impositively actuated by the weight-supporting mechanism.

As illustrated, a small gear-pinion 8 should be understood to be on the same shaft with the indicating hand 7 though not fully detailed to that extent, the gear-pinion being actuated by the gear-rack 9, which, in turn, is connected to the rod 10, from which a weight-member 11 is suspended, 12 designating a contact-member arranged at a suitable point above member 11.

It should be understood that the whole indicating mechanism, including the hand 7, gear-rack 9, rod 10, weight-member 11, and contact-member 12, is of the lightest construction so as to operate without any great, or undue momentum, the weight-member 11 merely imposing a slight bias upon the indicator so that the contact-member will more readily perform its function.

The contact-member 12 is arranged to follow any movement of the weight actuated parts of the scale.

In this particular case, as illustrated, any platform upon which a person may stand for weighing purposes is connected by the upwardly extending rods 13 and 14 to the main weight-supporting spring 15, which is adjustably attached to the crosshead 16, a stationary part of the housing of the scale.

The crosshead 16 is provided with engaging means 17 arranged so that the main spring 15 may be screwed adjustably to the crosshead thereby. Similar engaging means 17a are provided on the top connecting piece 18 for the rods 14. With the help of these engagements, the spring 15 can be securely attached to the housing of the scale so as to suitably support the platform of the scale.

It should be understood that any lugs, such as indicated at 17 and 17a, can be made to extend between coils of a spring so that a manipulation of the spring with respect to such lugs must result in a screwing effect, whereby the lugs can be screwed more or less into the spring longitudinally, thereby varying the effective length of the spring between the oppositely disposed spring-supports 17 and 17a, or any similar attachments.

For limiting the downward movement of the indicator-actuating mechanism, a stop is provided for the contact-member 12.

Inasmuch as this invention concerns itself with the self-adjustability, or adaptability under different temperatures, and since metals, or any connecting parts of a scale, particularly, the main spring, are subject to expansion and contraction under temperature variations, the stop is made to assume changes as much as possible according to such expansions and contractions.

As the main spring 15 and other parts of the weight-supporting parts expand under temperatures and thereby move further away from the weight-indicating parts, the stop must correspondingly come nearer, or approach the normal or correct position of the contact-member 12 in a manner to assure a correct indication on the dial regardless of any variations of movements.

While variations of expansions in the rods 13 and 14 may be compensated by a corresponding provisioning or proportioning in the rod 10; any variations in the main spring 15 is best compensated by an equal spring, and this is done by the spring 19 that is only to carry the stop, to bring this stop further up corresponding to any change of the main spring downwardly.

In order to facilitate an adjustment of the stop-spring to most properly correspond to adjustments of the main spring, the stop spring is similarly mounted as at 17b and 17c very much the same as at 17 and 17a of the main spring.

For a separate adjustment, to facilitate a proper setting of the dial showing, to zero-position, as well as in general, a screw-sleeve 20 is provided, whereby accurate and fine adjustments may be assured.

Preparatory to the finer adjustments, the approach-spring with the stop may be raised or lowered on the rods 14 by means of the supporting crosshead 21 that is held in position on the rods 14 by means of set screws 22.

From the above, it should be understood that it is absolutely immaterial how the lower end of the rod 13 is attached to any sort of weight-supporting means, such as a platform, or whatever else is used to support matter on any scale.

The only thing that this invention is concerned about is the temperature compensating means for the upwardly extending portions of the weight-sustaining parts of any scale, the invention having in mind such upwardly extending portions that commonly vary in length in such a manner as to influence the correctness of the co-operating weight-indicating means, the invention involving particularly variances that may result from supporting springs.

The spring 15, for instance, is such a supporting spring, which, under temperature changes, is liable to vary in length, and, by such varying, will affect the correctness of the co-operating indicating mechanism by the fact that the stop 20 would naturally drop down further by any expansion of the spring 15, so that the following contact-member 12 would cause the indicating hand to move to an incorrect position.

It stands to reason that, if the stop 12 is advanced so as to correspond to the expanding of spring 15, the indicating mechanism will indicate correctly as if the spring 15 had not expanded at all.

To accomplish this, the spring 19 has been inserted in the present construction, and this spring is preferably of equal characteristics with respect to the spring 15, so that spring 19 will expand upwardly to an equal distance that the spring 15 eventually expands downwardly; any eventual contraction of either spring being similarly equalized by nature, so that the stop 20 will always approach, or move towards the point where the position of the contact-member 12 should be for a correct weight-indicating.

Having thus described my invention, I claim:

1. In a scale comprising a frame, a primary spring supported by said frame, means for sustaining a load supported by said primary spring, a weight indicating mechanism including a contact member arranged to follow impositively the movements of the load sustaining means, a temperature compensating spring carried by said load sustaining means, one end of the compensating spring being fixed to the load sustaining means and the opposite end normally engaging said contact member, said compensating spring being designed to expand in a direction opposite to that of the primary spring for effecting compensating correction of said indicating mechanism.

2. In a scale, a weight sustaining structure including a main supporting spring, a weight-indicating mechanism including a contact member arranged to follow the movements of said structure, and a second spring mounted on said structure separate from the main spring, both springs being of equal characteristics with respect to expansion and contraction and disposed to expand and contract in opposite directions, the second spring embodying means for limiting the following movements of said contact member with temperature compensating effects with respect to the main spring.

3. In a scale, a weight sustaining structure suspended by a main spring, the main spring being subject to temperature expansion in a downward direction, a weight-indicating mechanism having means disposed to follow the weight sustaining structure by contact, and a temperature compensating spring on the weight-sustaining structure disposed to be subject to temperature influenced expansion in an upward direction and forming a movement limiting means against the contacting means.

4. In a scale, a weight sustaining structure suspended by a main spring, said spring being subject to temperature influenced expansion in a downward direction, a weight-indicating mechanism having contacting means disposed to follow said structure by contact, a temperature compensating spring on said structure disposed to be subject to temperature influenced expansion in an upward direction against the contacting means, and an adjustment for the contacting means with respect to the compensating spring.

5. In a scale comprising a frame, a primary spring supported by said frame, said spring being subject to temperature influenced expansion, a weight sustaining structure suspended from said spring, a weight-indicating mechanism having contacting means to follow the weight sustaining structure, and a temperature compensating spring on said structure and extending with its free end to form a movement limiting stop for the contacting means.

6. In a scale, a frame, a weight sustaining structure suspended by a main spring from said frame, the spring being subject to temperature influenced expansion in a downward direction, a weight-indicating mechanism having contacting means disposed to follow said structure by contact, a temperature compensating spring on said structure disposed to be subject to temperature influenced expansion in an upward direction against the contacting means, and an adjustment for the contacting means with respect to the compensating spring.

WILLIAM R. McDONALD.